(No Model.) 2 Sheets—Sheet 1.

C. LUSTED, Sr.
GRASS CUTTING ATTACHMENT.

No. 508,030. Patented Nov. 7, 1893.

Witnesses

Inventor
C. Lusted, Sr.
By his Attorneys, (No Model.) 2 Sheets—Sheet 2.
C. LUSTED, Sr.
GRASS CUTTING ATTACHMENT.
No. 508,030. Patented Nov. 7, 1893.
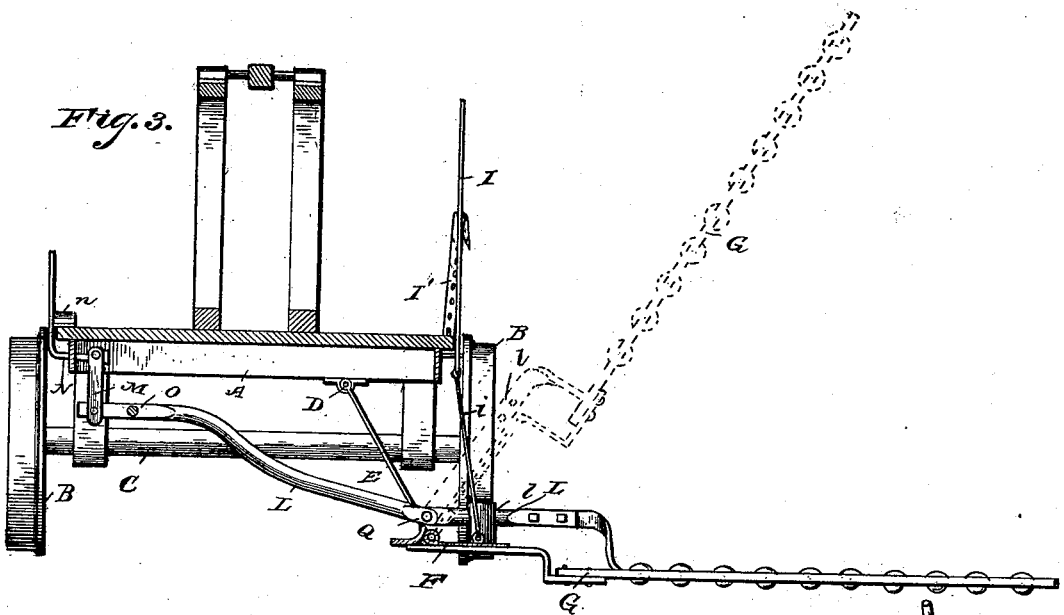
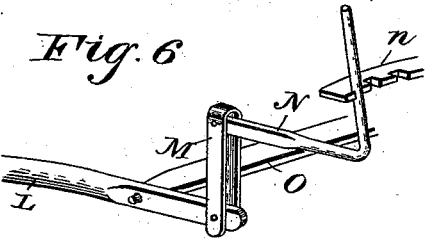
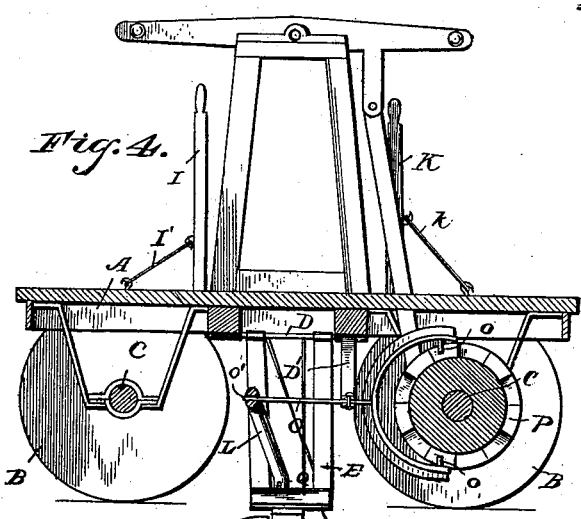
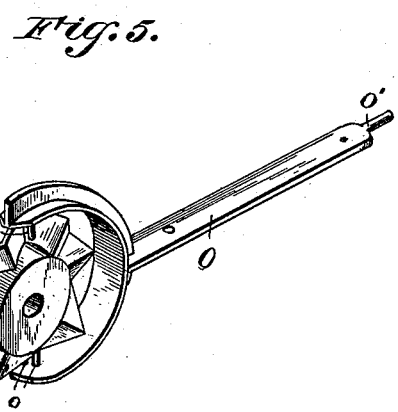

United States Patent Office.

CHARLES LUSTED, SR., OF LAFAYETTE, LOUISIANA.

GRASS-CUTTING ATTACHMENT.

SPECIFICATION forming part of Letters Patent No. 508,030, dated November 7, 1893.

Application filed December 29, 1892. Serial No. 456,698. (No model.)

*To all whom it may concern:*

Be it known that I, CHARLES LUSTED, Sr., a citizen of the United States, residing at Lafayette, in the parish of Lafayette and State of Louisiana, have invented a new and useful Grass-Cutting Attachment, of which the following is a specification.

My invention relates to grass cutting attachments for hand-cars, and it has for its object to provide such a device embodying simplicity, durability and effectiveness.

Further objects and advantages of my invention will appear hereinafter and the novel features thereof will be particularly pointed out in the appended claims.

Figure 1:
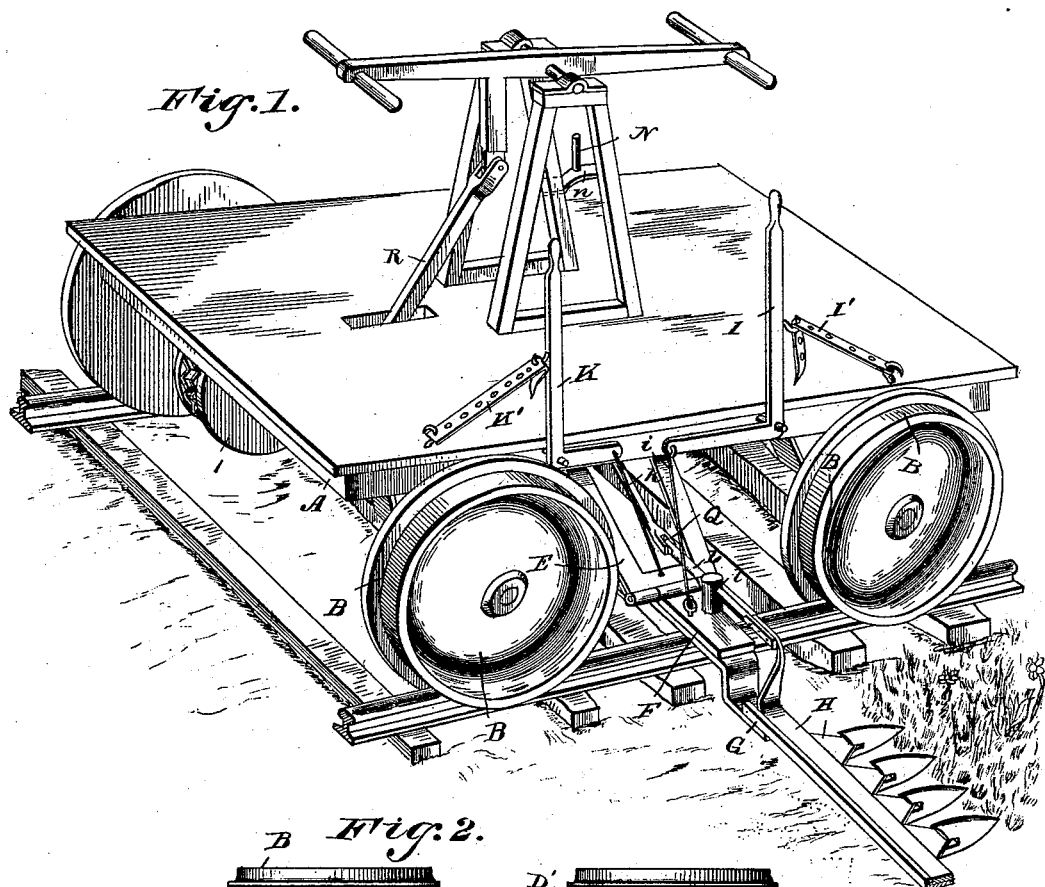
Figure 2:
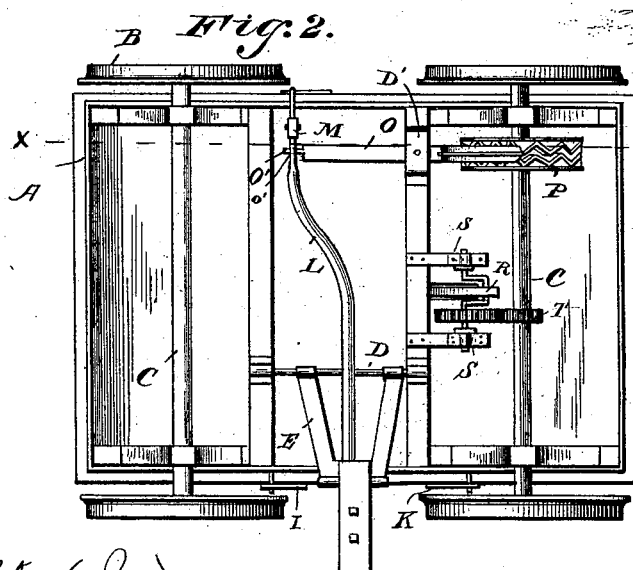

In the drawings, Figure 1 is a perspective view of a hand-car equipped with a cutting-attachment embodying my invention. Fig. 2 is an inverted plan view of the same. Fig. 3 is a transverse central section, showing in dotted lines the elevated position of the carrying-arm. Fig. 4 is a longitudinal sectional view, line $x$—$x$ of Fig. 2. Fig. 5 is a detail view, in perspective, of the cam-wheel. Fig. 6 is a detail view in perspective of the disk-connecting devices for the reciprocating rod.

A represents the frame of the hand-car, having traction wheels, B B, and axles C C.

To the under side of the platform of the car is attached the bar, D, upon which is pivotally mounted the adjustable hanger, E, which normally inclines outward toward its lower end. Pivotally connected to the outer or free end of this hanger is the carrying-arm, F, to the outer end of which is attached the finger-bar, G, carrying the reciprocating cutter or knife, H.

A lifting lever, I, angular in shape is pivoted to the frame of the hand-car and is connected by a link, $i$, to the carrying-arm whereby the free end of the latter, with the finger-bar and cutter, may be elevated when not in use. A flexible check, I', is employed to engage a hook upon the lever to hold the carrying arm in its operative or its elevated position. An adjusting lever, K, similar in shape to the lever, I, is connected by a link, $k$, to the free end of the hanger E and is provided with a flexible check, K', engaging a hook upon the lever, to hold the cutting mechanism at the desired elevation above the surface of the ground. A reciprocating rod, L, is fitted to slide in a guide, $l$, upon the carrying-arm and is suspended at the opposite end by a swinging arm, M, the upper end of this swinging-arm being pivoted to a disconnecting lever, N, held in its operative position by a notched locking arm, $n$. Pivotally mounted in the bracket, D', is a forked oscillating lever, O, the arms of whose bifurcated end carry guide pins, $o$ $o$, which fit and operate in grooves in the cam-wheel, P, which is fixed to one of the axles of the hand-car. The particular form of this cam-wheel may be modified, as shown in Fig. 5, and otherwise, the object being to give an oscillatory movement to the lever, O, whose free end is provided with a stud or reduced portion, O', to engage a socket, $o'$, in the reciprocating rod, L. The reciprocating rod is jointed at Q, so that it may bend when the carrying-arm is elevated. By means of the disconnecting-lever the adjacent end of the reciprocating rod may be thrown away from the oscillating lever and its socket disconnected from the reduced end O' thereof to check the operation of the cutter or knife.

When the parts are in the position shown in Fig. 6 the reciprocating rod is engaged with the oscillating lever, whereby motion is communicated from the cam-wheel through the oscillating lever and reciprocating rod to the cutting mechanism, the disconnecting lever being held in its operative position by means of the notched locking-arm $n$. When it is desired to disconnect the parts in order to check the movement of the cutting mechanism, the disconnecting lever is released from the notch in the locking-arm and is swung rearwardly, thus swinging the link M and the connected end of the reciprocating rod L forwardly and detaching the reduced end of the oscillating lever from the socket in the reciprocating rod.

The object and the operation of this device will be understood without a detailed description thereof, herein, and as numerous minor changes in the disposition and construction of the mechanism may be resorted to without departing from the spirit of the invention, I reserve the right to make such alterations as may be expedient, within the scope of my invention.

Having described my invention, what I claim, and desire to secure by Letters Patent of the United States, is—

1. In a machine of the class described, the combination with a supporting frame-work and traction wheels, of a rotary cam having a zigzag grooved periphery, connections between said cam and the traction wheels, an oscillating lever having a fork, the arms of which are provided with pins to engage the cam groove at diametrically opposite points of the cam, a swinging hanger, a carrying arm pivotally connected to said hanger, cutting mechanism supported by the carrying arm, and a reciprocating rod connected to the cutting mechanism and detachably connected to the free end of the oscillating lever, substantially as specified.

2. In a machine of the class described, the combination with a supporting frame-work and traction wheels, of a cam operatively connected to said traction wheels, cutting mechanism a reciprocating rod connected to said cutting mechanism, an oscillating lever operatively connected to the cam and provided with a reduced end to engage a socket in the reciprocating rod, the latter being capable of lateral movement at its free end, a disconnecting lever, and a swinging link pivotally connected to the disconnecting lever and the reciprocating rod, whereby the socket of the latter may be disconnected from the oscillating lever, substantially as specified.

In testimony that I claim the foregoing as my own I have hereto affixed my signature in the presence of two witnesses.

CHARLES LUSTED, Sr.

Witnesses:
W. S. TORIAN,
CHAS. D. CAFFERY.